United States Patent [19]

Masera et al.

[11] Patent Number: 5,142,362
[45] Date of Patent: Aug. 25, 1992

[54] METHOD OF HYBRID DIGITAL CODING DISTINGUISHING MOTION PICTURES FROM STILL PICTURES

[75] Inventors: Lorenzo Masera, Alpignano-To, Italy; Fernando Pereira, Sacavém, Portugal

[73] Assignee: CSELT - Centro Studi e Laboratori Telecomunicazioni S.p.A., Turin, Italy

[21] Appl. No.: 658,215

[22] Filed: Feb. 20, 1991

[30] Foreign Application Priority Data

Mar. 2, 1990 [IT] Italy .................................. 67148 A/90

[51] Int. Cl.$^5$ ................................................ H04N 7/13
[52] U.S. Cl. .................................... 358/133; 358/105; 358/136
[58] Field of Search ................ 358/105, 135, 136, 85, 358/133; 341/200

[56] References Cited

U.S. PATENT DOCUMENTS 4,851,906 7/1989 Koga et al. ......................... 358/105
4,953,204 8/1990 Caronna ............................. 358/136

OTHER PUBLICATIONS

Motion Video Coding in CCITT SGXV—The Coded Picture Format by R. C. Nicol & N. Mukawa.
An ATM Adapted Video Coding Algorithm Operating at Low Bitrates by F. Pereira & L. Masera.
Motion Video Coding in CCITT SG XV—The Video Source Coding by Ronald Plompen et al.
Motion Video Coding in CCITT SGXV—The Video Multiplex and Transmission Coding by Mike Carr et al.

Primary Examiner—Victor R. Kostak
Attorney, Agent, or Firm—Herbert Dubno

[57] ABSTRACT

Still and moving picture components of a motion video transmission are coded by using the same algorithm. The system provides a posteriori recognition of still pictures on memorization of the quantization step used to code groups of pixels of a still picture which belong to a certain hierarchical level (e.g. the macroblock level), and allows convergence of the quantization step towards a minimum predetermined value.

16 Claims, 4 Drawing Sheets

METHOD OF HYBRID DIGITAL CODING DISTINGUISHING MOTION PICTURES FROM STILL PICTURES

FIELD OF THE INVENTION

The present invention relates to video-signal coding systems and, more particularly, to a process to be applied in hybrid coding systems when still and moving pictures are to be coded.

BACKGROUND OF THE INVENTION

In video signal coding the problems of coding still pictures (photographic videotex) or moving pictures (videoconference, visual telephony) are generally considered separately; suitable coding algorithms, which have been already internationally standardized or whose standardization is in progress, have been developed for both types of pictures.

More particularly, for moving pictures, CCITT Study Group SGXV has defined a coding process, to be employed in synchronous networks, which is the subject matter of CCITT Recommendation H 261. The process suggested by this Group is a differential process of the so-called hybrid type, wherein at a given instant:
the difference between the original current frame and the coded frame relevant to the preceding instant is calculated;
a check is made on whether a motion compensation is suitable in this difference;
a two-dimensional Discrete Cosine Transform is applied to pixel blocks, possibly submitted to motion compensation;
the transform coefficients are quantized by variable-step quantizers and
the quantized coefficients are coded by a variable-length code.

The quantization step is periodically updated depending on the filling of a transmission buffer connected between the coder and a line for transmitting the coded signals to utilization devices. For scenes with strong changes, it is also possible to apply the transform to blocks of a current frame and not to the differences.

This process is described e.g. in the papers "Motion video coding in CCITT SGXV—The coded picture format", by R. C. Nicol and N. Mukawa, "Motion video coding in CCITT SGXV—The video source coding" by R. Plompen, Y. Hatori, W. Geuen, J. Guichard, M. Guglielmo, H. Brusewitz, and "Motion video coding in CCITT SGXV—The video multiplex and transmission coding" by M. Carr, J. Guichard, K. Matsuda, R. Plompen, J. Speidel, presented at IEEE Global Telecommunications Conference & Exhibition (Globecom '88), Holywood, Fla., U.S.A. Nov. 28th–Dec. 1st, 1988, and published on pages 992–996, 997–1004 and 1005–1010 of the Conference Proceedings (Papers 31.1, 31.2, 31.3).

Some modifications to this algorithm have been also suggested to allow its use in asynchronous networks, for which there is a growing interest since their intrinsic flexibility is particularly well suited to transmission of video signals characterized by non-uniform information flow, such as the signals relevant to video-conference and visual telephony. An example of modified algorithm has been described by U.S. in the paper "An ATM adapted video coding algorithm operating at low bit-rates" presented at the Second International Workshop on 64 kbit/s Coding of Moving Video, Hanover, 1989. In this algorithm, the coding operations are basically identical to those of the algorithm suggested by the CCITT Study Group. The transmission takes place at a variable bit rate and it is characterized by an average bit rate and a peak bit rate which are set by network controlling devices before the beginning of the transmission and are periodically monitored during transmission to adapt consequently the quantization step and possibly the space and time resolution.

In the case of videoconference and visual telephony it may be necessary to transmit not only the speaker figure (moving picture component), but also schemes or written texts (still picture component). Since the coding algorithm is of differential type, the difference between successive frames ought to be null when a still picture is being coded, and hence in a short time no more bits ought to be transmitted. In practice however, owing to the noise introduced both by the transform and quantization operations and by the camera, a difference always exists between subsequent frames of a still picture in case of both synchronous and asynchronous networks, so that the coder goes on transmitting bits without enhancing coded picture quality. Hence transmission of picture coding bits utilizes resources for transmission of other information.

No solutions to this problem appear to have been suggested hitherto. One could theoretically switch to a different coding algorithm when passing from a moving to a still scene, and to code the pictures of the latter by any standard still-picture coding algorithm. This would considerably increase complexity, since two different coding systems would be required as well as hand-controlled devices to signal a scene change and cause switching from one coding system to the other. In addition, when moving picture coding is resumed, the coding algorithm requires a new initialization, which entails a period of low quality of the coded picture.

OBJECT OF THE INVENTION

It is an object of the invention to provide method which can be used both for still and moving pictures during the same video transmission and by which a desired quality for a still picture can be achieved without coding bit waste and moving picture coding can be resumed with sufficiently high quality.

SUMMARY OF THE INVENTION

The invention provides a method of hybrid digital coding of video signals, concerning both moving and still pictures and organized into a sequence of frames which occur at a predetermined frequency and comprise a sequence of lines each comprising a predetermined number of pixels. Each frame is subdivided into pixel groups defining a plurality of hierarchical levels; for each frame there are coded, after quantization by a quantization law chosen for each group belonging to a first hierarchical level, coefficients of a two-dimensional transform applied either to a current frame or to the significant differences between the current frame and a predicted frame which has been possible submitted to a motion compensation. A coded signal is generated which comprises, among other information, information relevant to the coding type and the quantization law employed and which is transmitted asynchronously at variable bit rate, the quantization law adopted for a pixel group of the first hierarchical level using a quantization step which is determined by a coding control device and is variable depending on transmission bit availability. For each frame, the pixel groups are counted which belong to a second hierarchical level and which have been submitted to a predetermined coding type for a first number of previous consecutive frames, to recognize whether the frame belongs to a still or to a moving picture, and upon recognition of a still picture, for each pixel group of such a picture belonging to the first hierarchical level the quantization step is caused to converge towards a predetermined minimum value, which is the same for all groups, by the following operations:

a) memorizing the quantization steps used for that group in the different frames of the still picture;
b) detecting and memorizing a real quantization step which is the minimum quantization step used up to the current frame;
c) comparing the real quantization step and the quantization step determined for that group in the current frame by the coding control device;
d) coding the transform coefficients relevant to that group with a quantization step equal to that determined by the coding control device, if the latter step is lower than the real quantization step or, if the quantization step determined by the coding control device is greater than or equal to the real quantization step, coding of the coefficients by a particular quantization step obtained by increasing by a first predetermined quantity the real quantization step, in case of poor bit availability, and with a step obtained by reducing said minimum step by a second predetermined quantity in case of high bit availability, the coding quantization step to be used in the latter case being a unitary step if the value of the real step is less than the second predetermined quantity; and
e) updating the real quantization step, whenever the coding is performed with a quantization step lower than the real quantization step.

Advantageously, for pictures where the frames are divided into blocks of luminance and chrominance pixels, macroblocks and groups of macroblocks, the convergence operations are performed for each group of macroblocks within a frame, and the still picture is recognized by counting the macroblocks for which:
the transform has been applied to the differences between a current frame and a predicted frame;
transform coefficients have been coded; and
a motion compensation has been performed in the prediction.

According to another feature of the invention, progressively increasing space and/or time resolution levels are used during still picture coding and the operations causing convergence to the minimum value of the quantization step used for the various groups belonging to the first hierarchical level are performed for each resolution level.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
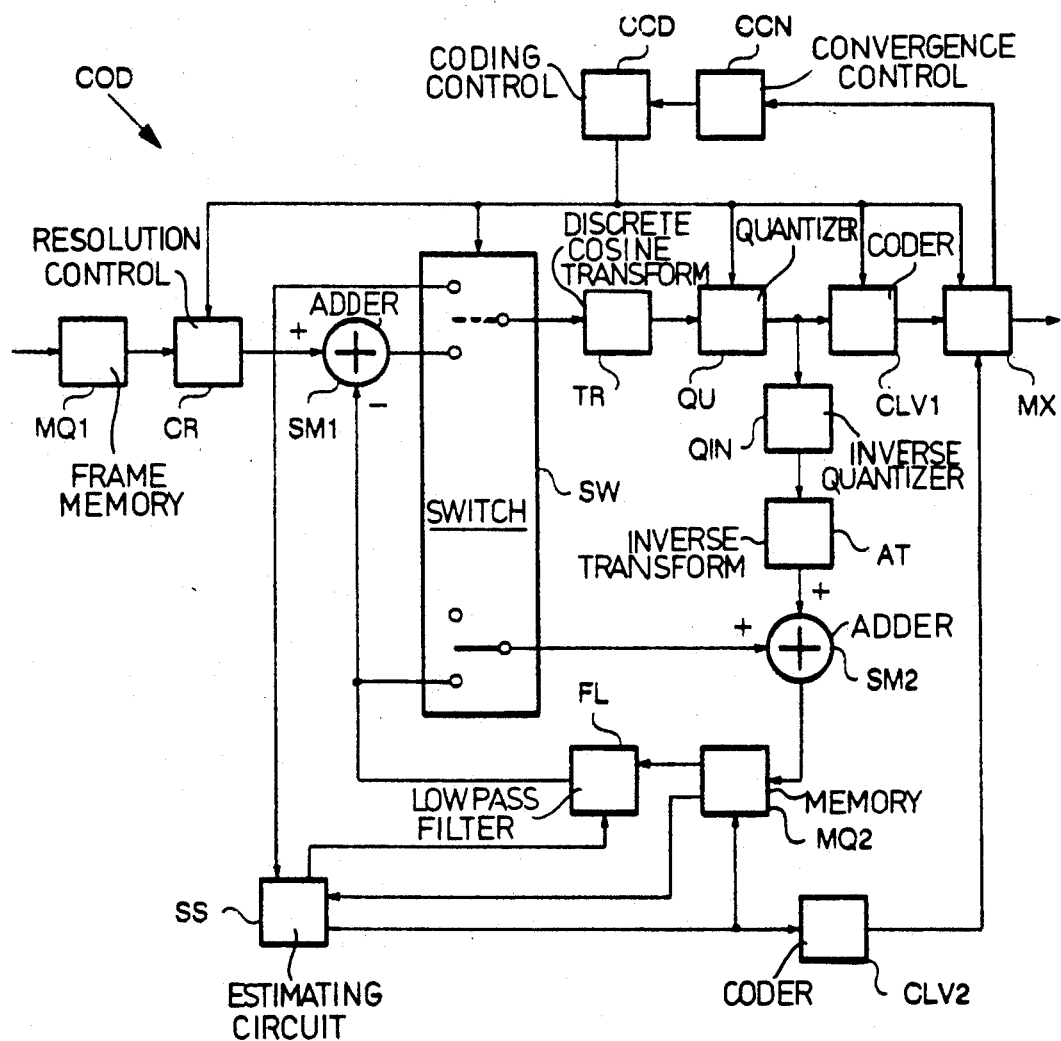
FIG. 1 is a block diagram of a coder to which the invention is applied.

Reference COD in FIG. 1 denotes on the whole a coder for moving picture signals of the type developed by CCITT Study Group SGXV and adapted to use in asynchronous networks. The application of the invention in said coder does not entail modifications of its structure, which will then be described only to the extent necessary for the understanding of the invention.

The coder receives from a television camera, not shown, digital samples (pixels) relevant to the individual frames of a television transmission, which samples are stored in a frame memory MZ1. The samples are read from MZ1 so as to supply the downstream devices, at each frame, with a digitized picture having a resolution established by a coding control device CCD. More particularly, during reading, a subsampling is performed which, according to the proposals of CCITT Study Group SGXV, results in a standard resolution of $360 \times 288$ luminance pixels (288 lines per frame and 360 pixels per line) and $180 \times 144$ chrominance pixels. As described in our above mentioned paper, the resolution could be modified during transmission depending on bit availability, e.g. as a function of a parameter, hereinafter referred to as 'excess', representing the difference between the number of bits produced from the beginning of the transmission up to the current instant and the number of bits which could be transmitted during the same time on a fixed bit-rate channel operating at the average bit rate set before beginning the transmission. In addition, the possibility is envisaged of increasing the resolution during still picture coding, on the basis of the coding evolution, as will become clearer hereinafter. The possibility of modifying the space resolution is represented by the presence of the resolution control device, which is driven by the coding control device CCD and basically consists of a memory device wherein the samples actually used for coding operations are stored.

Always in accordance with the proposals of CCITT Study Group SGXV, the samples to be coded are organized according to a hierarchical structure, which provides for a grouping of the samples into: blocks (B) of $8 \times 8$ luminance or chrominance pixels (i.e. 8 adjacent samples in each of 8 consecutive lines), macroblocks (MB) of $16 \times 16$ luminance pixels (4 blocks B) and two physically coincident sets of $8 \times 8$ chrominance (U.V) pixels, and groups of macroblocks (GOB) composed of 33 macroblocks arranged on three rows of 11 macroblocks; a frame comprises in turn 12 groups of macroblocks. Since the coding algorithm operates on the macroblocks, some pixels are eliminated to obtain an integer number of macroblocks. The actual resolution is $352 \times 288$ (luminance) and $176 \times 144$ (chrominance).

Depending on the characteristics of the picture in the current frame, coding control device CCD determines whether the coding must take into account only the current frame (intraframe coding) or both the current and the preceding frame (interframe coding). If intraframe coding is performed, the sample blocks of the current frame are sent to devices TR computing a two-dimensional transform (e.g. a Discrete Cosine Transform); in case of interframe coding by contrast the difference between the current frame and the quantized and reconstructed preceding frame is transmitted.

Adder SM1 schematizes the devices calculating that difference, and switch SW, controlled by CCD, schematizes the possibility of choosing either intraframe or interframe coding.

Circuit TR performs a two-dimensional transform on all blocks, if intraframe coding is considered, while in case of interframe coding the transform is performed only on those difference blocks which are significantly different from a homologous block in the preceding frame or from a block which has undergone a displacement with respect to the preceding frame. The transform coefficients, computed in TR, are supplied to quantizer QU, which quantizes, by a quantization law chosen by device CCD at the macroblock group level in function of excess parameter, all coefficients whose value exceeds a predetermined threshold. Quantized coefficients are sent on one side to circuit CLVF1, which codes them according to a variable length coding, and on the other side to inverse quantizer QIN. The latter is followed by a circuit AT computing the inverse transform and by an adder SM2 adding the quantized and reconstructed difference supplied by AT to the block stored in a second frame memory MQ2, thereby forming the reconstructed block relevant to the preceding frame; the reconstructed block forms the updated content of MQ2.

The samples read in memories MQ1 and MQ2 are supplied to a displacement estimating circuit SS which is active in case of interframe coding and compares a block to be coded in the current frame with the adjacent blocks of the preceding frame to recognize variations solely consisting of a displacement of the considered picture portion and to evaluate the displacement entity (motion compensation). This circuit computes a displacement vector relevant to a macroblock and supplies it both to memory MQ2 and to a low-pass filter FL which is active in case of motion compensation to reduce the contrasts, and also to a second variable-length coder CLV2, which codes the vectors different from 0 in differential way with respect to the preceding vector. Displacement vector can be computed e.g. as described in the above mentioned paper by R. Plompen. The signals outgoing from CLV1, CLV2 and a flag indicating interframe/intraframe coding are used by control device CCD to obtain a classification of the macroblocks namely: intraframe-coded macroblocks; non-compensated, non-coded macroblock (i.e. a macroblock for which the displacement vector is null and no transform coefficients have been coded); non-compensated, coded macroblock (i.e. a macroblock for which the displacement vector is null but transform coefficients have been coded); compensated, non-coded macroblock (for which only the coded displacement vector is transmitted); compensated and coded macroblock (for which both the coded displacement vector and coded transform coefficients are transmitted).

The signals representing such classification together with the signals coded by CLV1, CLV2, the index of the quantizer used and other service information are combined by a multiplexer MX into a codeword of suitable format (for instance, the format disclosed denoted in the above mentioned paper by M. Carr). The output signal of MX forms the coded video signal, which will be subsequently combined with other signals, e.g. audio signals, data signals, particular signallings required by the type of service where the coder is employed, and sent to decoding devices at a receiver.

The present invention is part of the coding operation control and allows quantization step optimization in presence of still pictures during transmission. The present invention avoids repeated quantizations of a same hierarchical unit in the picture by the same quantization step, since this produces bits which solely code the various error types. Hereinafter reference will be made by way of example to the application of the invention at the level of the group of macroblocks, since according to the proposals of Study Group SGXV the quantization step is chosen at that level; yet it is evident that the process can be applied to a different hierarchical unit.

To implement the method of the invention, a convergence control device CCN is connected between multiplexer MX and coding control device CCD in order to recognize still pictures and, upon such recognition, to control CCD so that the quantization step permitting optimum exploitation of the bits available may be chosen for each macroblock group.

Figure 2:
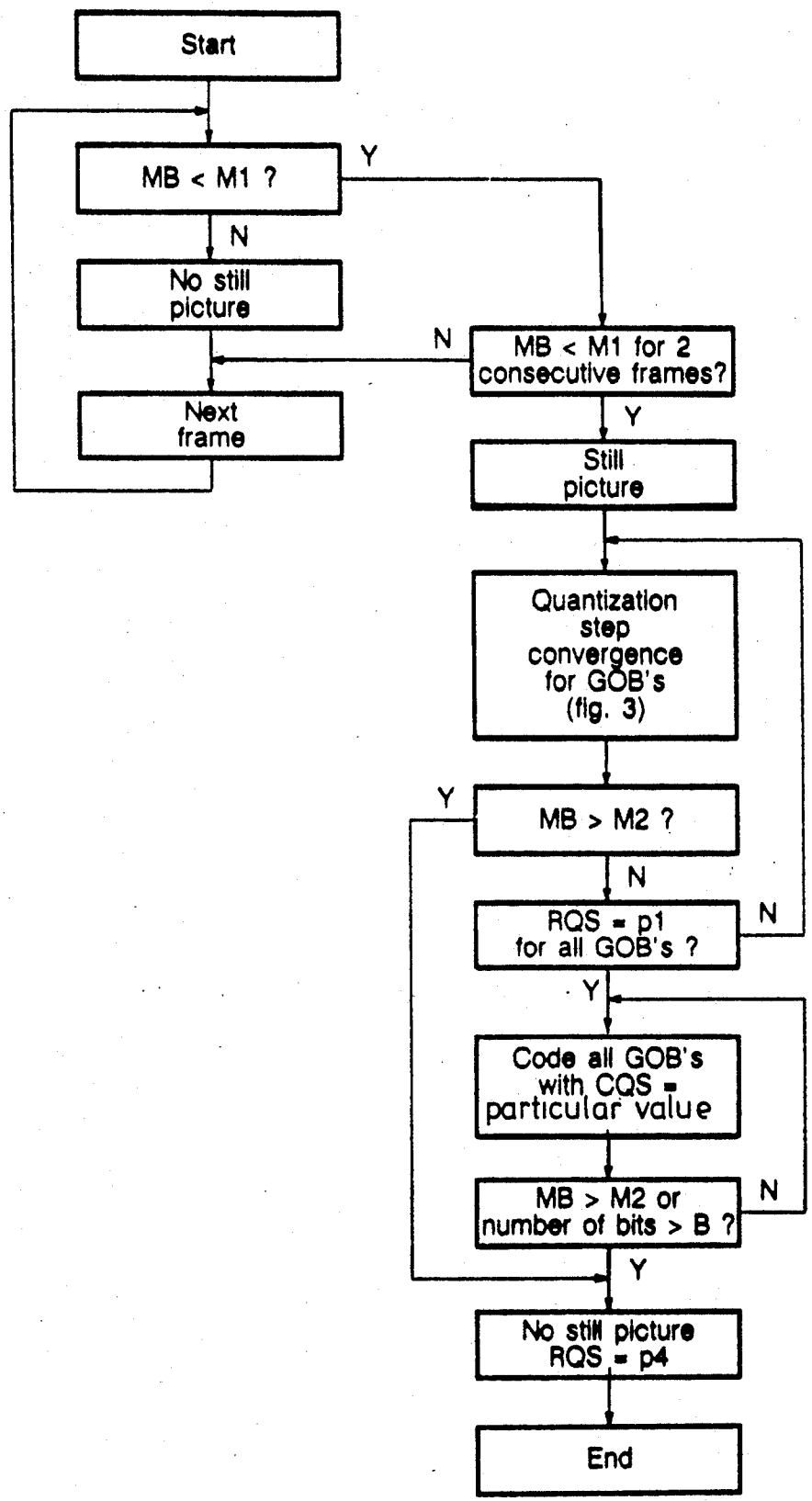
FIG. 2 and 3 are flow charts of the operations of the convergence controlling circuit implementing the invention.
Figure 3:
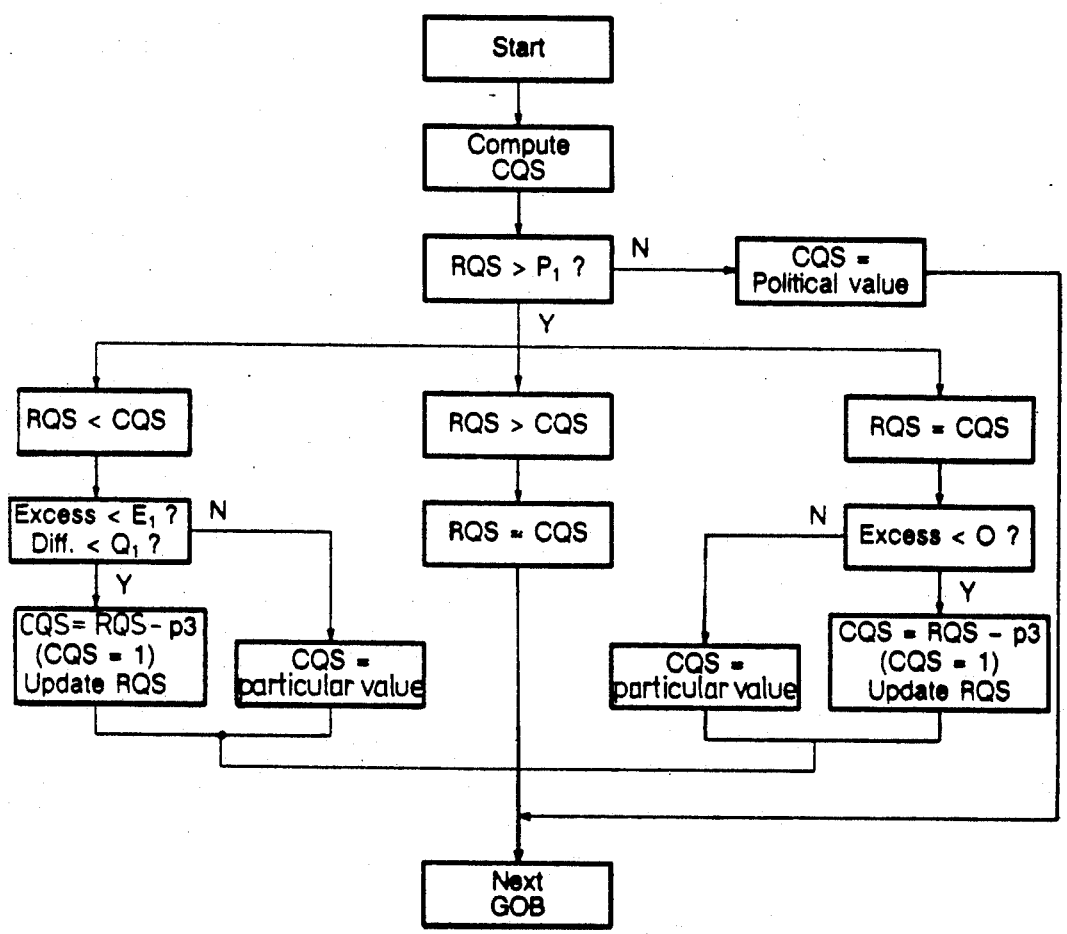

The method o the invention is shown in the algorithm charts of FIGS. 2 and 3.

To recognize still pictures CCN exploits the classification of macroblocks, implementing an a-posteriori recognition criterion. More particularly, a counter in CCN counts the coded and compensated macroblocks and a picture is held as still if the number MB of such macroblocks is lower than a predetermined threshold M1, whose value depends on the frame frequency, for a certain number of consecutive frames (e.g. 2). A suitable value for M1 can be 30, for frame frequencies lower than 25 Hz, or 20, for frame frequencies higher than or equal to 25 Hz.

This choice is justified by the fact that, if a significant number of macroblocks has undergone motion compensation and coding in two consecutive frames, it is reasonable to assume that the picture is moving and that the differences between subsequent frames are not due only to noise; on the other hand, it has been ascertained that uncorrelated noise causes an increase in the number of coded, non-compensated macroblocks, and hence the adopted choice criterion is sufficiently accurate.

Once the still picture has been recognized, quantization step CQS to be used for coding a group of macroblocks is determined by taking into account the history of the coding process concerning that group of macroblocks. More particularly the quantization step determined by device CCD by applying the standard coding algorithm is compared with the minimum quantization step RQS used for coding the same group of macroblocks in the preceding frames. This value RQS will hereinafter be referred to as "real quantization step". The comparison result, together with a possible evaluation of the above-defined excess parameter and of the maximum difference between the values of RQS relevant to different groups of macroblocks in the frame being coded, determines whether CQS must have the value determined by the algorithm or a different value, related with RQS. More particularly, under certain conditions which will be examined hereinafter in more details, the quantization step used is obtained by increasing RQS by a predetermined fixed quantity p2 (e.g. 20). The value $CQS = RQS + p2$ will be hereinafter referred to as a particular quantization step. The value of p2 is chosen so that the quantization step is low enough to allow a coding with sufficiently high quality in case of scene changes or abrupt movements, while being sufficiently different from the minimum quantization step used up to that instant so as to supply a significant coded signal.

The convergence process ends when RQS has reached a predetermined value p1 (e.g. 1) for all the groups of macroblocks; once this value has been reached, the particular value of CQS is used as long as the picture remains still, so that the device is ready to code a moving picture or a scene change.

Of course a moving picture or a scene change can occur either before or after value RQS=p1 is reached for all the groups of macroblocks. Consequently, exit from the convergence process can take place in two ways:

Independently of value RQS, when number MB of coded and compensated macroblocks in the last frame has exceeded a threshold M2 slightly lower than M1: it is to be appreciated that the process starts when the number of these macroblocks is lower than threshold M1 for two subsequent frames, and hence leaving the process is easier than entering it; suitable values for M2 can be 25 and 18, depending on frame frequency.

When RQS is p1 for all groups and the number of bits in a frame exceeds a certain value B1 (e.g. 1000), even though number MB in the last frame has not exceeded M21. Actually, scene changes or movements interesting a limited number of macroblocks are possible; however in correspondence with these changes there is a strong increase in the number of bits to be transmitted, and this allows recognition of the change itself.

When leaving the convergence process, the groups of macroblocks belonging to the first frame after exit from the process will be coded by a quantization step p4 (e.g. 8) such as to avoid picture cut phenomena.

FIG. 3 depicts in more details the part of convergence process relevant to a group of macroblocks. As said, the first step after detecting a still picture is the comparison between the values of CQS and RQS. Then three ways of evolution of the convergence process are possible on the basis of the comparison result:

1)CQS<RQS: this is the simplest situation; the new quantization step determined by the algorithm has not yet been used while coding that group of macroblocks and moreover it ensures coded picture quality enhancement; the coding is performed by using value CQS actually determined by the algorithm and this value is the updated value RQS which is stored in CCN.

2) CQS>RQS: under that condition coding could be performed in the first instance by the particular value of the quantization step, since step CQS determined by the algorithm could be too high to allow coding of a possible scene change or abrupt movement with sufficient quality, or too close to RQS to offer a useful contribution to coding. However, the evolution of the coding process might have been such as to allow the employ of a lower quantization step and hence, to decide the most favorable quantization step, also a check is performed on the excess parameter and on the difference Q1 between step RQS relevant to the group of macroblocks being coded and maximum step RQS used for the other macroblocks of the frame. If the excess is highly negative (with an absolute value greater than a threshold E1, e.g. about 2000) and the difference Q1 is low (e.g. ≦4) a value RQS−p3 (e.g. RQS−2), if RQS>p3, or 1, if RQS≦p3, is used as quantization step. In fact, the presence of a highly negative excess indicates that transmission is taking place at a much lower rate than the average rate, so that there is still a high bit availability and hence a lower quantization step can be used without problems; besides the value indicated for p3 allows the variance of quantization step to be kept limited in the frame.

3) CQS=RQS: in this case the quantization step determined by the algorithm is not to be used, since, as mentioned, repeatedly coding a group of macroblocks by a same quantization step merely produces useless bits and does not enhance picture quality. Even in this case the choice of the value to be used is determined on the basis of the check on the excess, and the political value will be used if the excess is positive (this means that more bits than the average are being used, and hence a greater quantization step can be useful to reduce such an excess), while if the excess is negative step value RQS−p3 (or 1) is used, as in the preceding case.

Once the operations for a group of macroblocks are over, the successive group of macroblocks is processed.

The process of the invention can be also successfully applied in a coder where a high bit availability can be exploited to increase space and/or time resolution. More precisely, starting from the standard resolution level used also for moving pictures, the convergence process can be stopped in correspondence with an average value R of the real quantization step higher than p1 and a higher resolution level can then be used. Actually, the previously indicated standard resolution (360×288 pixels per frame for luminance and 180×144 pixels per frame for chrominance) can be insufficient. Then for instance three resolution levels can be provided, the first of which is the standard level, the second provides a horizontal space resolution twice as high as the standard one for both the chrominance and the luminance, while the third present both a horizontal space resolution and a time resolution twice as high as the standard level.

A coding method comprising both the convergence process and the resolution adaptation begins using the above-mentioned standard resolution and goes on using such resolution till recognition of a still picture. Under these conditions the convergence process starts as described. When the average value of RQS in the frame is R, the second resolution level is adopted. For the first frame at the new level, the convergence process can start with the quantization step determined by the coding algorithm for that frame (i.e. there is no memory of the quantization step from one level to the next). As an alternative, it is possible to take into account the values of RQS reached in the preceding level. Besides, for the first frame, threshold M2 for the number of compensated and coded macroblocks is changed, to avoid untimely exits from the convergence process. If even at the second level the conditions for resolution increase are reached, passage to the third level takes place with the same modalities as seen for the passage from the first to the second. It is clear that, if the convergence process for the various groups of macroblocks in the coding at a given resolution level restarts from the quantization step reached during the convergence at the preceding level, threshold M2 which determines the transition from a level to the next will be different for the various levels and will decrease as resolution increases.

Figure 4:
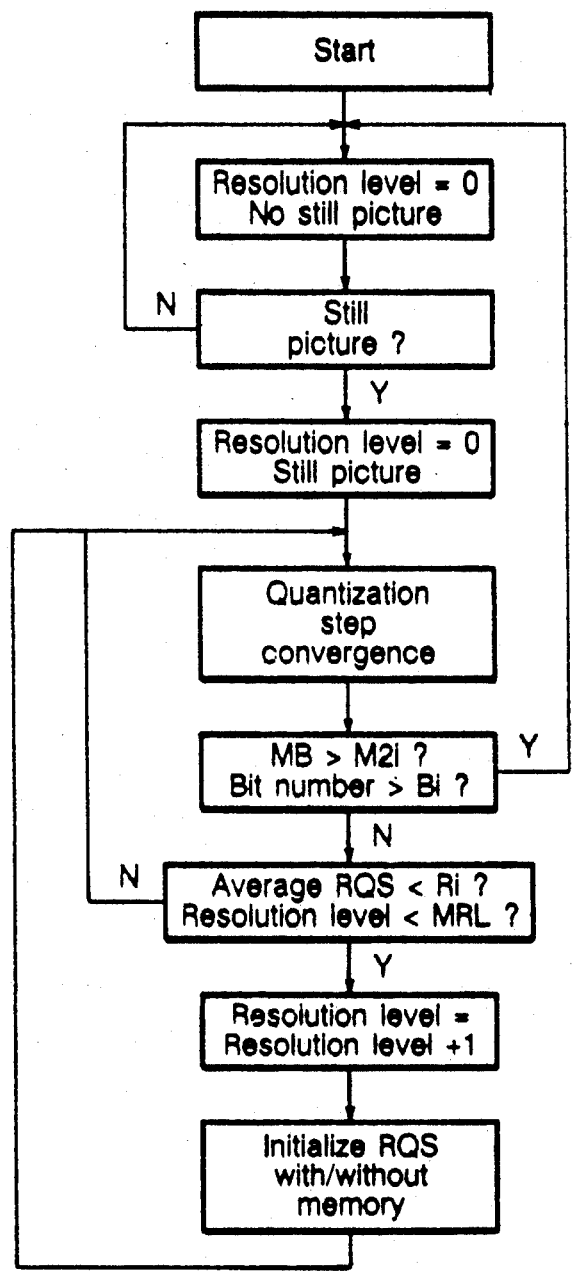
FIG. 4 is a flow chart of the insertion of the convergence process into a coding with resolution level adaptation.

A process which incorporates both the resolution adaptation and the convergence is schematically represented in the flow chart of FIG. 4, for the general case in which the resolution levels range from a minimum (level 0) to a maximum MRL. Symbols M2i, Bi indicate, for each resolution level, the thresholds for the number of coded, compensated macroblocks and respectively for the number of bits which determine the exit from the convergence process, while Ri is the means value of RQS which determines the passage to the higher resolution level. The flow chart is exhaustive and does not require further explanations.

It is clear that what described has been given only by way of non limiting example. Variations and modifications are possible without going out of the scope of the invention.

We claim:

1. A method of hybrid digital coding of video signals, concerning both moving and still pictures, and organized into a sequence of frames which occur at a predetermined frequency and are formed by a sequence of lines each comprising a predetermined number of pixels, wherein: each frame is subdivided into pixel groups defining a plurality of hierarchical levels; for each frame there are coded, after quantization by a quantization law chosen for each group belonging to a first hierarchical level, coefficients of a two-dimensional transform applied either to a current frame or to the meaningful differences between the current frame and a predicted frame which has been possibly submitted to a motion compensation; and a coded signal is generated which comprises, among other information, information relevant to the coding type and to the quantization law employed, and which is asynchronously transmitted at variable bit rate, the quantization law adopted for a pixel group of the first hierarchical level using a quantization step determined by a coding control device (CCD) and varying depending on transmission bit availability, wherein, for each frame, the pixel groups are counted which belong to a second hierarchical level and which have been submitted to a predetermined coding type for a first number of previous consecutive frames, to recognize whether the frame belongs to a still or to a moving picture, and upon recognition of a still picture, for each group of pixels of such a picture belonging to said first level the quantization step is made to converge towards a predetermined minimum value (p1), which is the same for all groups, by the following operations:

a) memorizing the quantization steps used for that group in the different frames of the still picture;

b) detecting and memorizing a real quantization step (RQS) which is the minimum quantization step used till the current frame;

c) comparing the real quantization step (R) and the quantization step determined for that group in the current frame by the coding control device (CCD);

d) coding the transform coefficients relevant to that group with a quantization step (CQS) equal to that determined by the coding control device (CCD), if the latter step is lower than the real quantization step (RQS) or, if the quantization step determined by the coding control device is greater than or equal to the real quantization step (RQS), coding of the coefficients by a particular quantization step obtained by increasing by a first predetermined quantity (p2) the real quantization step, in case of poor bit availability, and with a step obtained by reducing said real step by a second predetermined quantity (p3) in case of high bit availability, the coding quantization step to be used in the latter case being a unitary step if the value of the real step is less than the second predetermined quantity;

e) updating the real quantization step, whenever the coding is performed with a quantization step lower than the real quantization step.

2. A method as claimed in claim 1, wherein a still picture is identified when the number of groups of the second hierarchical level submitted to the predetermined coding type decreases below a first threshold (M1) for a first number of consecutive frames.

3. A method as claimed in claim 1, wherein, for pixel groups which belong to the first hierarchical level and for which the quantization step determined by the coding control device (CCD) exceeds the real quantization step (RQS), the value (CQS) of the quantization step to be employed for the coding is determined by a joint evaluation of the bit availability and of the difference between the real quantization step relevant to that group and the maximum real quantization step used in the frame, while for pixel groups for which the quantization step determined by the coding control device (CCD) is equal to the real step the value (CQS) to be employed is chosen by evaluating the only bit availability.

4. A method as claimed in claim 1, wherein reaching the predetermined minimum value (p1) for the quantization step relevant to a pixel group, the coding of the same group is performed by using the particular value of the quantization step.

5. A method as claimed in claim 1, wherein said predetermined minimum value (p1) is 1.

6. A method as claimed in claim 1, wherein the operations causing convergence towards the minimum quantization step (p1) and/or the coding by said particular quantization step are stopped when the number of groups submitted to the predetermined coding type exceeds a second threshold (M2), which is less than the first (M1), for a second number of frames which is less than the first number, or when the number of bits in a frame exceeds a third threshold (B).

7. A method as claimed in claim 6, wherein, for at least the first frame after stopping the convergence operations, the real quantization step (RQS) is set to a predetermined value (p4).

8. A method as claimed in claim 1, wherein increasing space and/or time resolution levels for a picture are successively used during still picture coding, and the operations causing the quantization step of the individual groups belonging to the first hierarchical level to converge to the minimum value (p1) are performed for each resolution level.

9. A method as claimed in claim 8, wherein a means value of the real quantization level (RQS) of the various groups belonging to the first hierarchical level is calculated for each frame, and a higher resolution level is employed when said means value is less than a predetermined threshold value (Ri).

10. A method as claimed in claim 9, wherein for the first frame following a change in the resolution level the real quantization step for each group belonging to the first hierarchical level is the quantization step determined by the coding control device (CCD).

11. A method as claimed in claim 9, wherein for the first frame following a change in the resolution level the real quantization step is the one reached at the end of the operations performed at the preceding resolution level.

12. A method as claimed in claim 11, wherein said threshold value (Ri) is different for the different resolution levels and decreases as resolution level increases.

13. A method as claimed in claim 8, wherein for the first frame following a resolution level variation the value of second threshold (M2) is increased.

14. A method as claimed in claim 8, wherein said resolution levels comprise a base level, used also during moving picture coding, an intermediate level obtained by doubling the number of pixels per each line, and a top level obtained by doubling the frame frequency with respect to the intermediate level.

15. A method as claimed in claim 1, wherein the pixels in a frame are grouped into: blocks of luminance or chrominance pixels, macroblocks comprising a plurality of blocks, and groups of macroblocks, characterized in that said first hierarchical level is the level of the group of macroblocks, and said second hierarchical level is the macroblock level.

16. A method as claimed in claim 15, wherein a still picture is identified by counting the macroblocks for which: the transform has been applied to the differences between a current and a predicted frame; transform coefficients have been coded; a motion compensation has been performed in the prediction.

* * * * *